(12) United States Patent
Stis

(10) Patent No.: US 6,970,087 B2
(45) Date of Patent: Nov. 29, 2005

(54) DEVICE AND METHOD OF DETECTING METAL OBJECTS

(76) Inventor: Gil Stis, 41/13 Nachal Lachish Street, Ashdod (IL)

( * ) Notice: Subject to any disclaimer, the term of this patent is extended or adjusted under 35 U.S.C. 154(b) by 11 days.

(21) Appl. No.: 10/626,288

(22) Filed: Jul. 24, 2003

(65) Prior Publication Data

US 2004/0113781 A1    Jun. 17, 2004

(30) Foreign Application Priority Data

Jul. 28, 2002   (IL) ...................................... 150932

(51) Int. Cl.[7] ............................................ G08B 17/00
(52) U.S. Cl. ...................... 340/551; 340/657; 324/228; 324/326; 324/327; 324/329
(58) Field of Search ................ 340/551, 540, 340/657; 324/228, 326, 327, 329

(56) References Cited

U.S. PATENT DOCUMENTS

| | | |
|---|---|---|
| 3,971,983 A | 7/1976 | Jaquet |
| 5,039,981 A | 8/1991 | Rodriguez |
| 5,521,583 A * | 5/1996 | Frahm et al. ................ 340/551 |
| 5,680,103 A * | 10/1997 | Turner et al. ................ 340/551 |
| 6,791,329 B2 * | 9/2004 | Nelson ........................ 324/329 |
| 2005/0116825 A1 * | 6/2005 | Manneschi .................. 340/551 |

FOREIGN PATENT DOCUMENTS

EP            1329742 A2 *   7/2003   ............ G01V 3/10

* cited by examiner

Primary Examiner—Julie Bichngoc Lieu
(74) Attorney, Agent, or Firm—George A. Leone

(57) ABSTRACT

A metal detecting device for the detection of a metal object concealed in shoe or on a leg of a subject, including:
  a housing with a platform having an upper surface with indication areas thereon for the correct positioning of each of a subject's feet,
  left-foot and right-foot electromagnetic coils under the indication areas connected to a power supply via an oscillator and a switch,
  an electromagnetic shield divider between the left-foot and right-foot electromagnetic coils,
  a detection system for the detection of the placement of the subjects feet on the indication area,
  a processing unit for processing signals from the electromagnetic coils and detection system, and
  a display connected to the processing unit for displaying a warning signal if metal is detected.

16 Claims, 4 Drawing Sheets

DEVICE AND METHOD OF DETECTING METAL OBJECTS

FIELD OF THE INVENTION

The present invention is directed to security applications, and more particularly to metal detection.

BACKGROUND OF THE INVENTION

Due to a recent spate of terrorist activity, security has been stepped up at airports, bus and train stations, shopping centers and malls, and at museums, landmarks and other potential targets.

Baggage is often subjected to X-Ray examination; however because of the health risks involved with exposure to radiation, such techniques are not favoured for examination of persons.

Where necessary, frisking or strip searching of persons may be performed, but such procedures are very time-consuming, and the subjects of such examinations may consider these procedures embarrassing and degrading.

For detection of chemical substances such as drugs and plastic explosives, dogs have been found effective. For detecting weapons such as knives and guns, metal detectors are widely used.

Two common metal detectors in widespread use are the wand-type metal detector and the frame-type metal detector. The principle of operation of both these devices is similar, in that they both detect the presence of metal objects using eddy-currents and the electromagnetic effect. The wand-type metal detector is quickly swiped over and around the abdomen and perhaps the thighs of the subject Although minimally intrusive and not particularly pleasant, it has the advantage over conventional frisking in that it keeps the hands of the operator distanced from the body of the subject. Indeed, if used skillfully, the wand-type detector need not actually touch the subject at all. If a metal object, such as a door key or loose change, is found, the subject is invited to remove and display the object himself and the examiner need neither touch the possessions nor the body of the subject.

The frame-type metal detector, see for example U.S. Pat. No. 3,971,983 to Jaquet, resembles a door frame through which the subject is required to pass. Indication of a metal object by a beep or a light, typically results in the subject being required to remove metal objects from about his person, and put them in a tray that is passed around the frame.

Neither of the above metal detector types is recommended for use with subjects fitted with pacemakers, where interference with the pacemaker may be injurious to health. Another problem with their use is that neither is effective for disclosing metal objects concealed within the shoes of the subject, or strapped around the ankle or lower leg. The wand-type detector is not conveniently swiped over these lower extremities, and indeed cannot be done without compromising the security of the personnel operating the device. The frame-type detector has low sensitivity near the ground, by virtue of the ground tending to provide an alternative, preferred pathway for electromagnetic field lines.

The poor performance of metal detector systems of the prior art with regard to detection of objects concealed on the lower leg or foot, makes these locations a likely concealment area for knives or hand guns for hijackers, terrorists and smugglers.

One simple idea for overcoming this problem is described in U.S. Pat. No. 5,039,981 to Rodriguez, which discloses a riser platform, that is, a step, for introducing into the detector frame. The subject is caused to pass through the electromagnetic field at a height above ground level, and may be requested to stand on the step. Being largely free from ground and other forms of interference, an enhanced sensitivity is achieved.

Metal detecting security equipment is typically positioned near entrances to buildings, and there are various sources of electromagnetic interference, such as the proximity of automatic doors, electronic machinery, people using mobile phones and the like, which generate stray electromagnetic fields that can act as sources of noise, triggering false alarms. Static electricity charges picked up from artificial carpets, and conveyer belts and escalators may cause similar problems. Shoe heels are frequently attached to the shoe with nails, and some shoes contain eyelets for laces, buckles, steel toe caps, strike plates and/or steel heel inserts. Thus, in addition to being excellent places of concealment for weapons, they may also trip a metal detector and generate false alarms. However subjects may find being asked to remove their shoes humiliating. Shoe removal is also time-consuming, difficult for the arthritic, and unpleasant for all concerned where the subject suffers from foot-odour, for example.

There is thus a need for a metal detecting system that has enhanced sensitivity for weapons concealed in the shoe or on the lower leg, yet having a reduced susceptibility to false alarms from metal objects legitimately found in shoes, and the present invention is directed to providing that need.

SUMMARY OF THE INVENTION

It is an aim of the present invention to provide a metal detector and detection system that has enhanced sensitivity for weapons concealed in the shoe or on the lower leg.

It is a further aim of the present invention to provide a metal detector and detection system having reduced susceptibility to false alarms from metal objects legitimately found in shoes.

It is yet a further aim of the present invention to provide a metal detector and detection system that has little risk of interfering with pacemakers.

It is still yet a further aim of the present invention to provide a stand-alone, portable, compact metal detector and detection system.

It is still yet a further aim of the present invention to provide a metal detector and detecting system that has reduced susceptibility to electromagnetic interference from nearby equipment.

Accordingly, in a first aspect of the invention, there is provided a metal detecting device for the detection of a metal object concealed in shoe or on a leg of a subject, comprising:

a housing with a platform having an upper surface with indication areas thereon for the correct positioning of each of a subject's feet, left-foot and right-foot electromagnetic coils under the indication areas connected to a power supply via an oscillator and a switch, an electromagnetic shield divider between the left-foot and right-foot electromagnetic coils, a detection system for the detection of the placement of the subjects feet on the indication area, a processing unit for processing signals from the electromagnetic coils and detection system, and a display connected to the processing unit for displaying a warning signal if metal is detected.

Optionally the power supply is a DC power source provided by a dedicated power pack. Preferably the power supply is rechargeable. Optionally the power is supplied from a main power supply or power grid.

Optionally the detection system for detecting the correct placement of the subject's feet includes pairs of IR-LEDs and IR detectors.

In a second embodiment of the invention the metal detecting device preferably includes two secondary electromagnetic coils per foot. Signals obtained from the secondary left-foot coils are compared with signals obtained from the primary left-foot electromagnetic coil to obtain an indication of mass and position of a metal object situated on left leg, and signal obtained from the secondary right-foot coils are compared with signals obtained from the primary right-foot electromagnetic coil to obtain an indication of mass and position of a metal object situated on right leg, and displaying details of any suspected metal objects on said display. In this embodiment the secondary coils are preferably situated at an angle of preferably 90° to the primary coils and current is applied via switch.

In another aspect of the invention there is provided a method for detecting metal objects concealed in a shoe or on the lower part of a leg of a subject using a two coil system as described hereinabove comprising the steps of: a) providing a metal detector as described above, b) applying current to a left-foot and to a right-foot electromagnetic coil in turn, for short time periods, typically several milliseconds, and recording eddy current signals therefrom;

c) comparing signals from the left-foot and right-foot electromagnetic coils to eliminate background interference;

d) positively detecting the presence of a subject's legs correctly positioned within the indication area on the platform as described above, e) comparing the signal obtained from the left-foot electromagnetic coil with the signal obtained from the right-foot electromagnetic coil when the presence of a correctly positioned subject's legs has been positively detected on the platform for differences between them, and f) displaying a warning signal on said display if significant differences in signals are detected.

Preferably, the method is used with a metal detector having three electromagnetic coils per leg as disclosed in the second embodiment. This way one can obtain an indication of the mass and position of a metal object concealed on a leg of a subject.

This method is substantially the same as the previous method with the exception that instead of only applying current to the primary coils, a) current is also applied via switch to the secondary coils situated at an angle of preferably 90° to primary coils;

(a) signals obtained from secondary left-foot coils are compared with signals obtained from primary left-foot electromagnetic coil to obtain an indication of mass and position of a metal object situated on left leg;

(b) signal obtained from secondary right-foot coils are compared with signals obtained from primary right-foot electromagnetic coil to obtain an indication of mass and position of a metal object situated on right leg, and (c) displaying details of any suspected metal objects on said display.

DESCRIPTION OF THE FIGURES

The present invention will be further understood and appreciated from the following detailed description taken in conjunction with the drawings in which.

DETAILED DESCRIPTION OF THE EMBODIMENTS

The present invention utilizes a pair of independent, but interconnected electromagnetic coil systems that provide a pair of independent electromagnetic fields for detecting metal objects attached to the legs. By comparing the signals from the two systems when no subject is being examined, background interference can be minimized. Each system is dedicated to a different leg of the subject and thus signals corresponding to small metal components, such as the nails holding the heel of the shoe in place, buckles and the like, that are common to both feet, can be identified and compensated for, but even small differences between the signals from each foot are identified, and thus sensitivity is enhanced.

Figure 1:
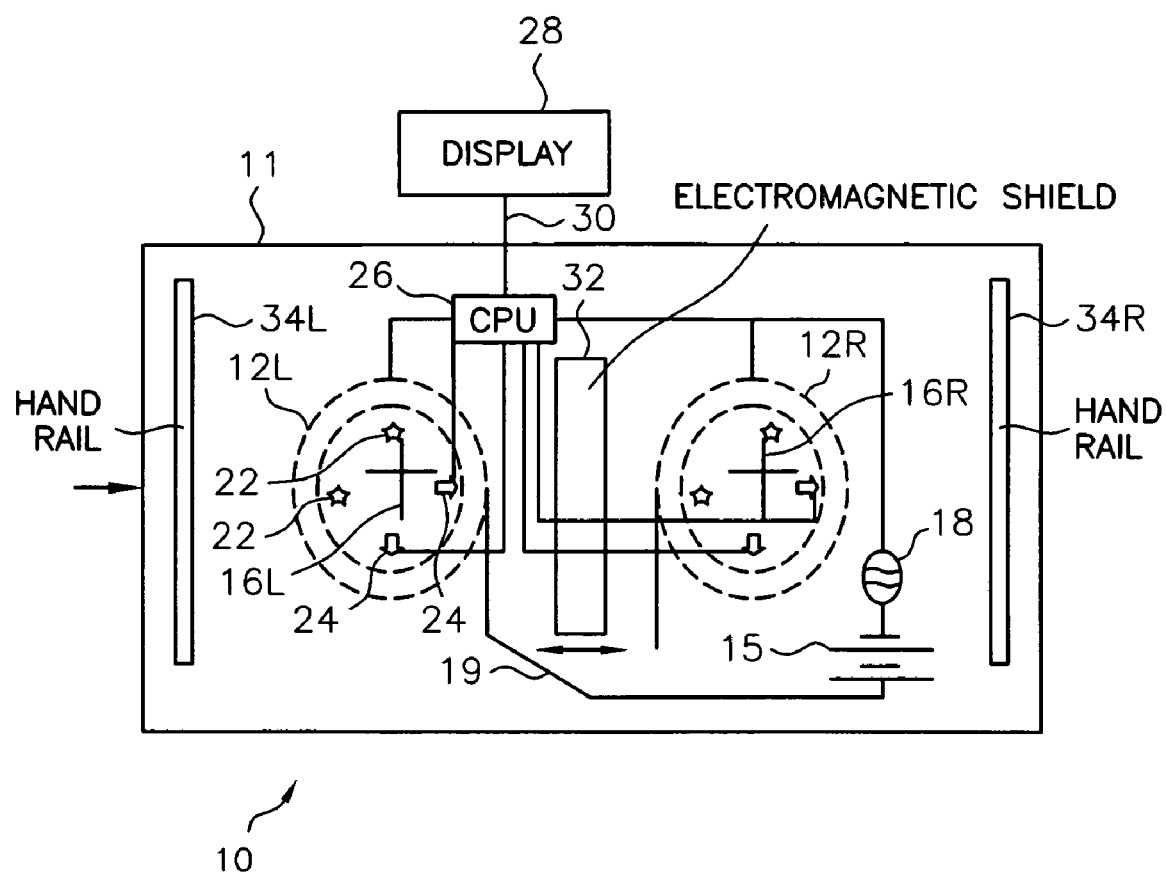
FIG. 1 is a schematic, overhead view of a first embodiment of the present invention.

Referring now to FIG. 1, there is shown a first embodiment of the present invention consisting of a housing with platform 10, containing a left electromagnetic coil 12L, and a right electromagnetic coil 12R coupled to a low voltage power source 15 and an oscillator 18, via a switch 19 for closing the circuit and applying alternating current to left 12L and right 12R electromagnetic coils in turn. Marked on the upper surface 11 of the platform, there are indications 16L, 16R that indicate where the subject should place his feet. A detector system consisting of two Infra red light emitting diodes (IR-LEDs) 22 paired with two IR detectors 24 per foot, is provided. The detector system detects whether a subject is correctly positioned on the platform or otherwise. The detector system and the electromagnetic coils are connected to a processing unit 26 which is further connected to a display 28 via a data bus 30.

The platform 10 is divided by an electromagnetic shield 32 which protrudes above the upper surface 11 of the platform 10, and serves to isolate the magnetic fields of the two electromagnetic coils 12L, 12R from one another. This isolates the magnetic field around each leg, and avoids interference from opposing electromagnetic fields generated by coils 12L, 12R, thus minimizing false readings and enhancing contrast between signals from each electromagnetic coil 12L, 12R.

The platform 10 may be manufactured from a lead free polymeric material, plywood or timber, taking care to avoid the use of screws, nails or other metal fixtures.

The display 28 may be a visual display, or an audio display. At its simplest, a light may go on, or a green light may change to red, or an alarm beep may be emitted to indicate that a metal object is present on the lower leg of a subject warranting further investigation. Once suspicions are aroused, the subject suspected of carrying some metal object can then be taken for further examination.

Platform 10 is preferably fitted with hand rails 34L and 34R, positioned on each side thereof, to facilitate the subject to mount, position himself and dismount therefrom.

The metal detector system described hereinabove, has low power requirements, and the low voltage power source 15 may be an internal power source consisting of storage batteries or the like, and can thus be set up away from a mains power supply, avoiding trailing cables that are inconvenient and hazardous. The internal power source is preferably rechargeable, but disposable battery cells may be used as well. Optionally, the metal detector system may be powered from a mains, enabling continuous use around the clock.

Figure 2:
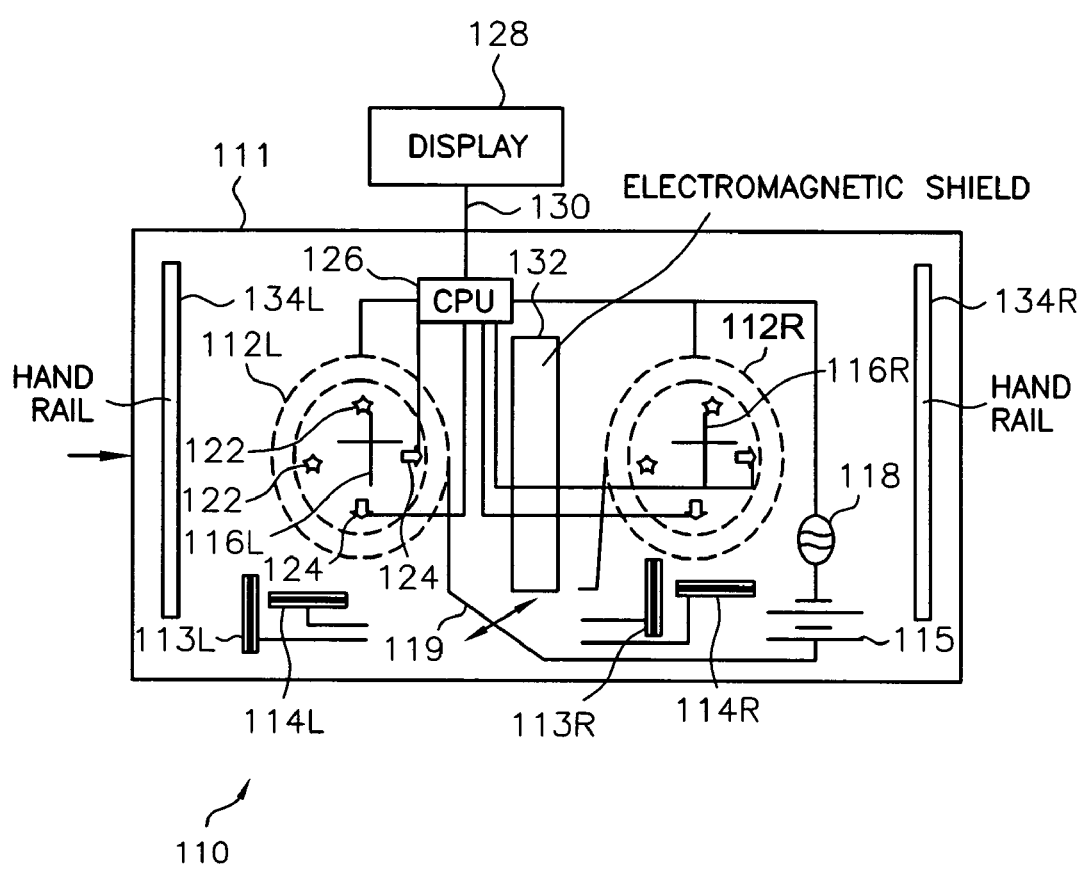
FIG. 2 is a schematic, overhead view of a second embodiment of the present invention.

Referring now to FIG. 2, there is shown a second embodiment of the present invention consisting of a housing with a platform 110 containing three left-foot electromagnetic coils, a primary coil 112L, and secondary coils 113L and 114L, for examining the left foot of a subject, and a second set of three corresponding electromagnetic coils 112R, 113R, 114R for examining the right foot of the subject. There is further included a low voltage power source 115 connected to an oscillator 118, a switch 119 for closing the circuit and applying alternating current to each of the coils 112L, 113L, 114L, 112R, 113R, 114R 12L in turn. Marked on the upper surface 111 of the platform, there are indications 116L, 116R to where the subject should place his feet. A detector system, similar to that in FIG. 1, consisting of Infra red light emitting diodes (IR-LEDs) 122 paired with IR detectors 124 is provided. The detector system detects whether a subject is correctly positioned on the platform 110 or otherwise. The detector system and the electromagnetic coils are connected to a processing unit 126 which is further connected to a display 128 via a data bus 130. The platform 110 is divided by an electromagnetic shield 132 which serves to isolate the two sets of electromagnetic coils and the signals indicating metal associated with each leg. The platform is typically provided with handrails 134L, 134R.

The operation of the second embodiment is similar to that of the first embodiment mutatis mutandis. However, since three readings are obtained per foot, it is possible to determine the exact position and size of detected metal objects with great accuracy.

The three electromagnetic coils 112L, 113L, 114L associated with the left foot should preferably be aligned in mutually perpendicular planes to minimize induced eddy currents therein. The same holds true for the three electromagnetic coils 112R, 113R, 114R associated with the right foot. Although desirable, mutual perpendicularity of the coils is not critical however, since the readings taken when no subject's foot is in position is used to determine the effect of these induced eddy currents, which may be fully compensated for.

The secondary coils 113L, 114L, 113R, 114R preferably protrude above the plane of the upper surface 111 of the platform 110, which is shaped to cover these protruding coils. Power is supplied to each coil in turn by the switch 119, typically for a few milliseconds. By comparing the absolute and relative magnitude of the signals obtained from each coil, and subtracting the signal corresponding to no subject, (i.e. the background noise level), the position and approximate size of any metal object on the lower leg of the subject can be determined.

In addition to simple warning lights and alarm beeps, the display 128 may include a screen displaying alphanumerically and/or graphically, further information concerning suspected metal articles such as their position, size, shape and type.

By comparing and contrasting the signals from each leg in this manner, the effects of background radiation can be minimized, as can the signals associated with nails, buckles and other metal objects associated with the shoes themselves. However, small objects such as the blades of Japanese knives and the battery or wire of a detonator can be detected with great reliability.

The oscillators 18 (FIG. 1), 118 (FIG. 2) will typically oscillate at a frequency of around 200 KHz, it being appreciated that the existence of metal within the electromagnetic field of the coil will affect the oscillation frequency.

Figure 3:
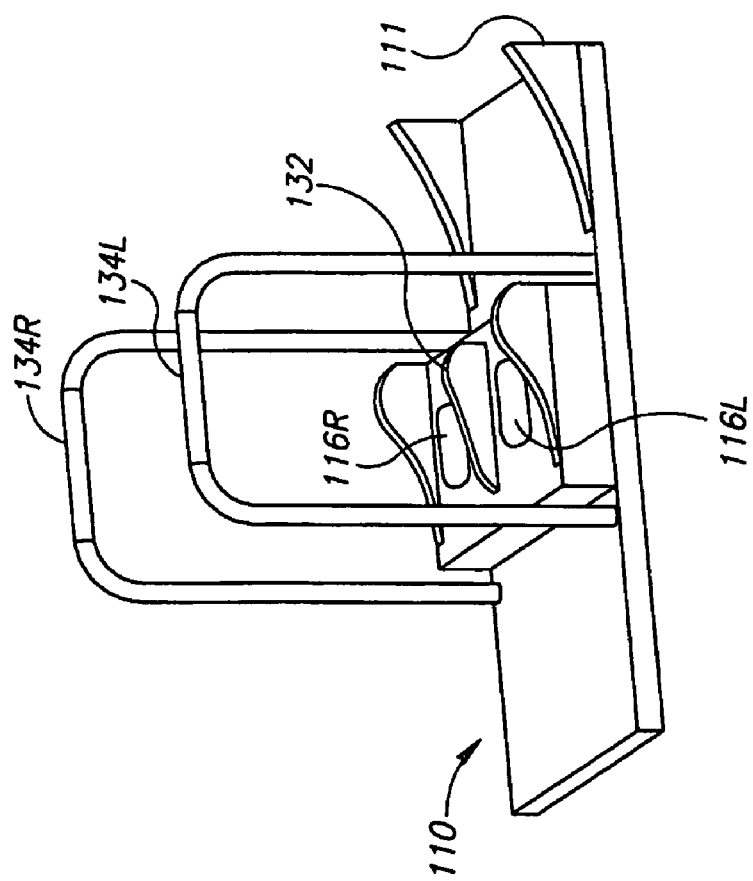
FIG. 3 shows, in isometric side view, an artist's impression of the second embodiment of the present invention.

Referring now to FIG. 3 there is shown, in isometric side view, an artist's impression of a metal detector device of the present invention, showing the platform 110, the position for the feet 116L, 116R, the electromagnetic shield 132 protruding above the surface 111 of the platform, and the handrails 134L, 134R.

Figure 4:
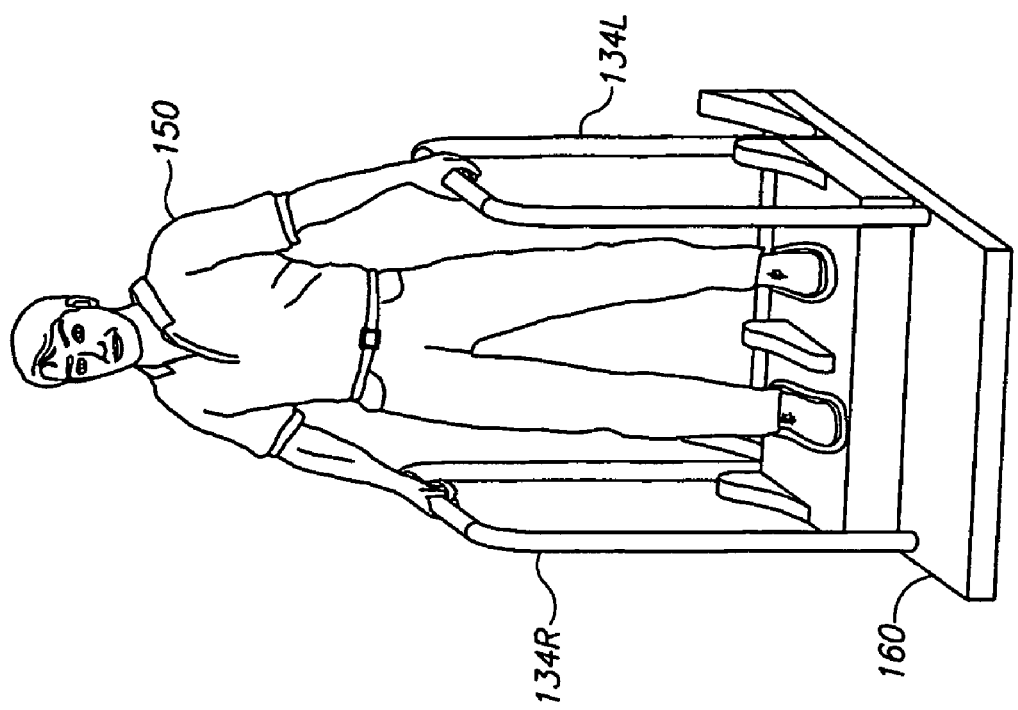
FIG. 4 shows, in front perspective view, an artist's impression of a subject positioned on an embodiment of the present invention.

Referring now to FIG. 4 there is shown, in front perspective view, an artist's impression of a subject 150 positioned on a metal detector device 160 of the present invention.

The method of detecting metals with the device of this invention is as follows. Power is supplied to each coil in turn for brief periods of time, typically milliseconds. The IR LEDs are continuously ON, and the IR detectors are continuously examined to see whether they indicate the presence of a foot or otherwise. The signals from each coil corresponding to no foot are continuously assessed to provide background signals used as baseline readings. When a signal from the IR detector indicates the presence of a subjects feet, correctly placed on the platform, an indication that a subject is now being examined is displayed on the display. If the difference between signals from left foot and right foot changes, a suspect metal object is indicated on the display by a light or an alarm signal. Exact control electronics, and appropriate algorithms for the programming of the processor will be clear to the man of the art, now that the concept of measuring the response from each leg and comparing them has been disclosed herein.

Figure 5:
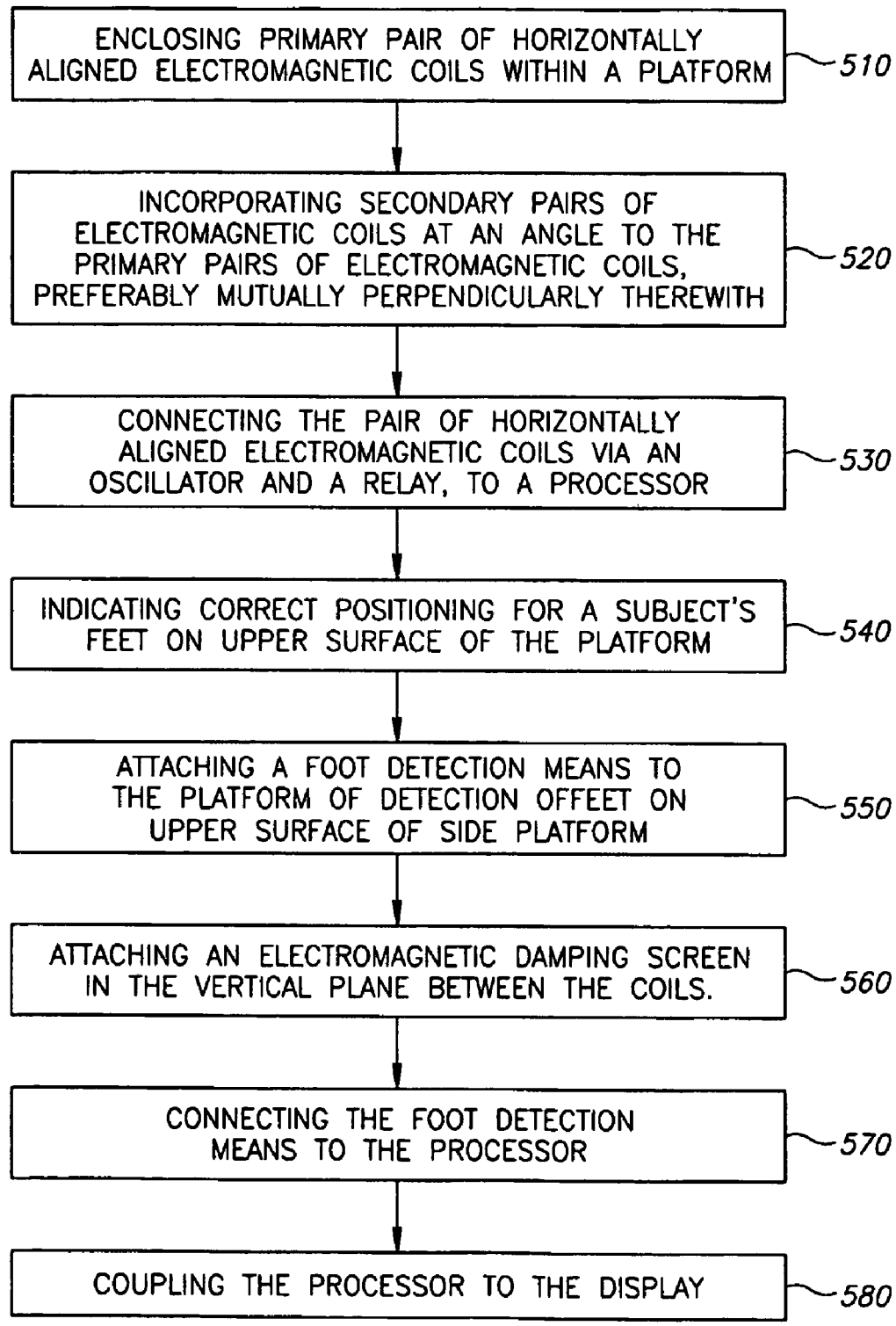
FIG. 5 is a flowchart illustrating a method for constructing the metal detecting system of the present invention.

Referring now to FIG. 5, there is shown a flow diagram of the method of assembling a metal detecting facility for detecting metal objects attached to the lower leg of a subject consists essentially of:

(a) enclosing (block 510) a primary pair of horizontally aligned electromagnetic coils within a housed platform, the platform being moulded from a polymeric material, or constructed from plywood, without using screws, nails or other metal fasteners;

(b) optionally and preferably, incorporating (block 520) secondary pairs of electromagnetic coils aligned at an angle to the primary pairs of electromagnetic coils, where the angle of alignment is preferably 90°.

(c) connecting (block 530) the pair of horizontally aligned electromagnetic coils via an oscillator and a switch, to a processor such that current may be supplied to each of the horizontally aligned electromagnetic coils in turn, typically for periods of milliseconds;

(d) indicating (block 540) the correct positioning for a subject's feet on upper surface of the platform;

(e) attaching (block 550) a foot detection means to the platform for detection of feet on upper surface of said platform, and connecting (block 570) the foot detection means to the processor. The foot detection means may be an IR source and a corresponding IR detector, such as is frequently used in elevators, automatic doors, and the like;

(f) coupling (block 580) the processor to a display for indicating the detection of detected metal objects Preferably, the method of assembling a metal detecting facility further includes the step of attaching (block 560) an electromagnetic damping screen in the vertical plane between said coils.

It will be appreciated that the invention is not limited to what has been described hereinabove merely by way of example. Rather, the invention is limited solely by the claims which follow, wherein the word comprise, and variations thereof, such as comprising, comprised and the like, are to be understood as indicating that the listed components or steps are included, but not necessarily to the exclusion of other components or steps.

What is claimed is:

1. A metal detecting device for the detection of a metal object concealed in shoe or on a leg of a subject, comprising:
    a housing with a platform having an upper surface with indication areas thereon for the correct positioning of each of a subject's feet;
    left-foot and right-foot electromagnetic coils under the indication areas connected to a power supply via an oscillator and a switch;
    an electromagnetic shield divider between the left-foot and right-foot electromagnetic coils;
    a detection system for the detection of the placement of the subject's feet on the indication area;
    a processing unit for processing signals from the electromagnetic coils and detection system; and
    a display connected to the processing unit for displaying a warning signal if metal is detected.

2. A metal detecting device as claimed in claim 1, wherein said power supply is a DC power source provided by a dedicated power pack.

3. A metal detecting device as claimed in claim 2, wherein said power supply is rechargeable.

4. A metal detecting device as claimed in claim 1, wherein said power supply is a mains power supply.

5. A metal detecting device as claimed in claim 1, wherein said detection system for detection of the correct placement of the subject's feet comprising pairs of IR-LEDs and IR detectors.

6. A metal detecting device as claimed in claim 1, further comprising two secondary metal detector coils per foot.

7. A method for detecting metal objects concealed in a shoe or on the lower part of a leg of a subject using a device as claimed in claim 1, comprising the steps of:
    a. applying current to a first left-foot electromagnetic coil, and a first right-foot electromagnetic coil in turn for a short time period that is typically several milliseconds and recording eddy current signals therefrom;
    b. comparing signal from the first left-foot electromagnetic coil with signal from the first right-foot electromagnetic coil to eliminate effect of background interference;
    c. positively detecting the presence of a subject's legs, correctly positioned with respect to said indication on said platform via a detection system;
    d. comparing signal obtained from first left-foot electromagnetic coil with signal obtained from first right-foot electromagnetic coil when the presence of a correctly positioned subject's legs have been positively detected on said platform for differences; and
    e. displaying presence of any differences on said display.

8. A method for obtaining an indication of mass and position of a metal object connected to a leg of a subject using a system as claimed in claim 6, comprising the steps of:
    a. applying current to a first left-foot electromagnetic coil, and a first right-foot electromagnetic coil in turn, for a short time period that is typically several milliseconds, and recording eddy current signals therefrom;
    b. comparing signal from the first left-foot electromagnetic coil with signal from the first right-foot electromagnetic coil to eliminate effect of background interference;
    c. positively detecting the presence of a subject's legs, correctly positioned with respect to said indication on said platform via a detection system;
    d. comparing signal obtained from first left-foot electromagnetic coil with signal obtained from first right-foot electromagnetic coil when the presence of a correctly positioned subject's legs have been positively detected on said platform for differences indicating presence of a metal object;
    e. comparing signal obtained from secondary left-foot electromagnetic coils with signal obtained from primary left-foot electromagnetic coil to obtain an indication of mass and position of a metal object situated on left leg;
    f. comparing signal obtained from secondary right-foot electromagnetic coils with signal obtained from primary right-foot electromagnetic coil to obtain an indication of mass and position of a metal object situated on right leg; and
    g. displaying details of any suspected metal objects on said display.

9. A method of assembling a metal detecting facility for detecting metal objects attached to the lower leg of a subject; said method comprising the steps of:
    a. enclosing a primary pair of horizontally aligned electromagnetic coils within a platform;
    b. connecting said pair of horizontally aligned electromagnetic coils via an oscillator and a switch, to a processor such that current is supplied to each of said pair of horizontally aligned electromagnetic coils in turn;
    c. indicating correct positioning of a subject's feet on upper surface of said platform;
    d. attaching a foot detection means to said platform for detection of feet on upper surface of said platform, and connecting said foot detection means to said processor; and
    e. coupling said processor to a display for indicating the detection of detected metal objects.

10. The method of claim 9 further comprising the step of attaching an electromagnetic damping screen in the vertical plane between said coils.

11. The method of claim 9 further comprising incorporating secondary pairs of electromagnetic coils aligned at an angle to said primary pairs of electromagnetic coils.

12. A method for detecting metal objects concealed in a shoe or on the lower part of a leg of a subject using a device as claimed in claim 2, comprising the steps of:
    a. applying current to a first left-foot electromagnetic coil, and a first right-foot electromagnetic coil in turn for a short time period that is typically several milliseconds and recording eddy current signals therefrom;

b. comparing signal from the first left-foot electromagnetic coil with signal from the first right-foot electromagnetic coil to eliminate effect of background interference;

c. positively detecting the presence of a subject's legs, correctly positioned with respect to said indication on said platform via a detection system;

d. comparing signal obtained from first left-foot electromagnetic coil with signal obtained from first right-foot electromagnetic coil when the presence of a correctly positioned subject's legs have been positively detected on said platform for differences; and e. displaying presence of any differences on said display.

13. A method for detecting metal objects concealed in a shoe or on the lower part of a leg of a subject using a device as claimed in claim 3, comprising the steps of:

a. applying current to a first left-foot electromagnetic coil, and a first right-foot electromagnetic coil in turn for a short time period that is typically several milliseconds and recording eddy current signals therefrom;

b. comparing signal from the first left-foot electromagnetic coil with signal from the first right-foot electromagnetic coil to eliminate effect of background interference;

c. positively detecting the presence of a subject's legs, correctly positioned with respect to said indication on said platform via a detection system;

d. comparing signal obtained from first left-foot electromagnetic coil with signal obtained from first right-foot electromagnetic coil when the presence of a correctly positioned subject's legs have been positively detected on said platform for differences; and e. displaying presence of any differences on said display.

14. A method for detecting metal objects concealed in a shoe or on the lower part of a leg of a subject using a device as claimed in claim 4, comprising the steps of:

a. applying current to a first left-foot electromagnetic coil, and a first right-foot electromagnetic coil in turn for a short time period that is typically several milliseconds and recording eddy current signals therefrom;

b. comparing signal from the first left-foot electromagnetic coil with signal from the first right-foot electromagnetic coil to eliminate effect of background interference;

c. positively detecting the presence of a subject's legs, correctly positioned with respect to said indication on said platform via a detection system;

d. comparing signal obtained from first left-foot electromagnetic coil with signal obtained from first right-foot electromagnetic coil when the presence of a correctly positioned subject's legs have been positively detected on said platform for differences; and e. displaying presence of any differences on said display.

15. A method for detecting metal objects concealed in a shoe or on the lower part of a leg of a subject using a device as claimed in claim 5, comprising the steps of:

a. applying current to a first left-foot electromagnetic coil, and a first right-foot electromagnetic coil in turn for a short time period that is typically several milliseconds and recording eddy current signals therefrom;

b. comparing signal from the first left-foot electromagnetic coil with signal from the first right-foot electromagnetic coil to eliminate effect of background interference;

c. positively detecting the presence of a subject's legs, correctly positioned with respect to said indication on said platform via a detection system;

d. comparing signal obtained from first left-foot electromagnetic coil with signal obtained from first right-foot electromagnetic coil when the presence of a correctly positioned subject's legs have been positively detected on said platform for differences; and e. displaying presence of any differences on said display.

16. A method for detecting metal objects concealed in a shoe or on the lower part of a leg of a subject using a device as claimed in claim 6, comprising the steps of:

a. applying current to a first left-foot electromagnetic coil, and a first right-foot electromagnetic coil in turn for a short time period that is typically several milliseconds and recording eddy current signals therefrom;

b. comparing signal from the first left-foot electromagnetic coil with signal from the first right-foot electromagnetic coil to eliminate effect of background interference;

c. positively detecting the presence of a subject's legs, correctly positioned with respect to said indication on said platform via a detection system;

d. comparing signal obtained from first left-foot electromagnetic coil with signal obtained from first right-foot electromagnetic coil when the presence of a correctly positioned subject's legs have been positively detected on said platform for differences; and e. displaying presence of any differences on said display.

* * * * *